United States Patent Office 3,236,767
Patented Feb. 22, 1966

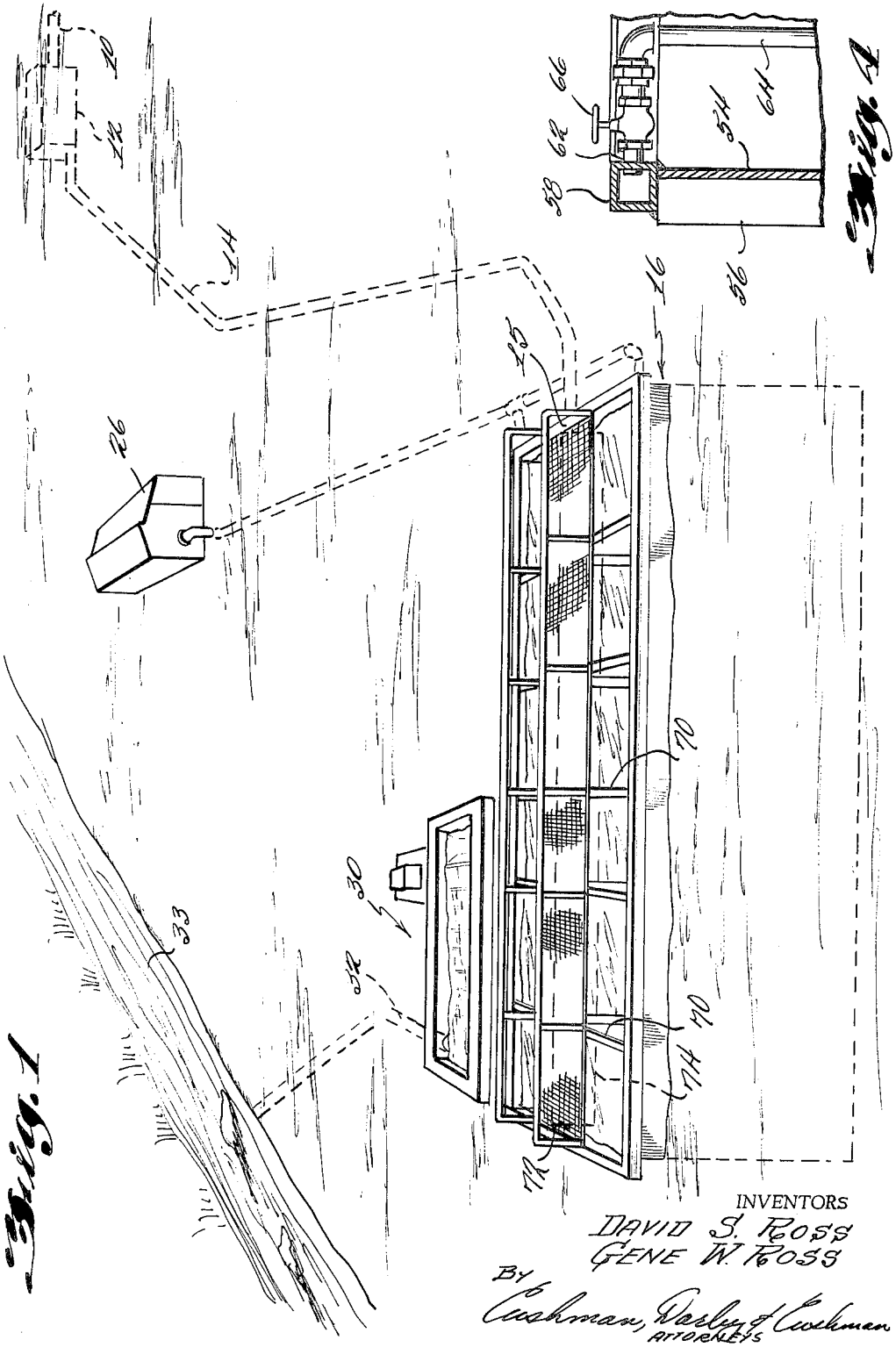

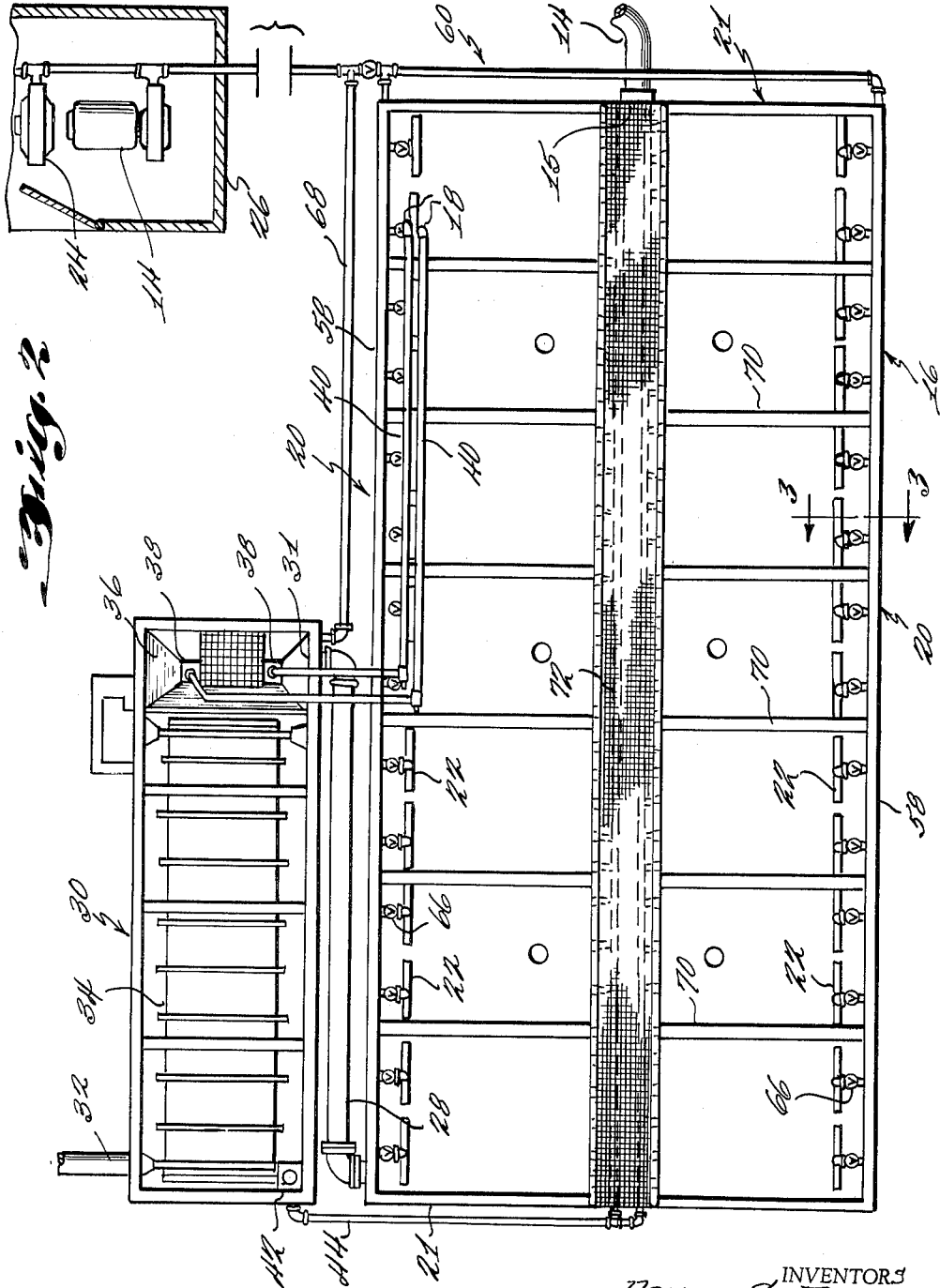

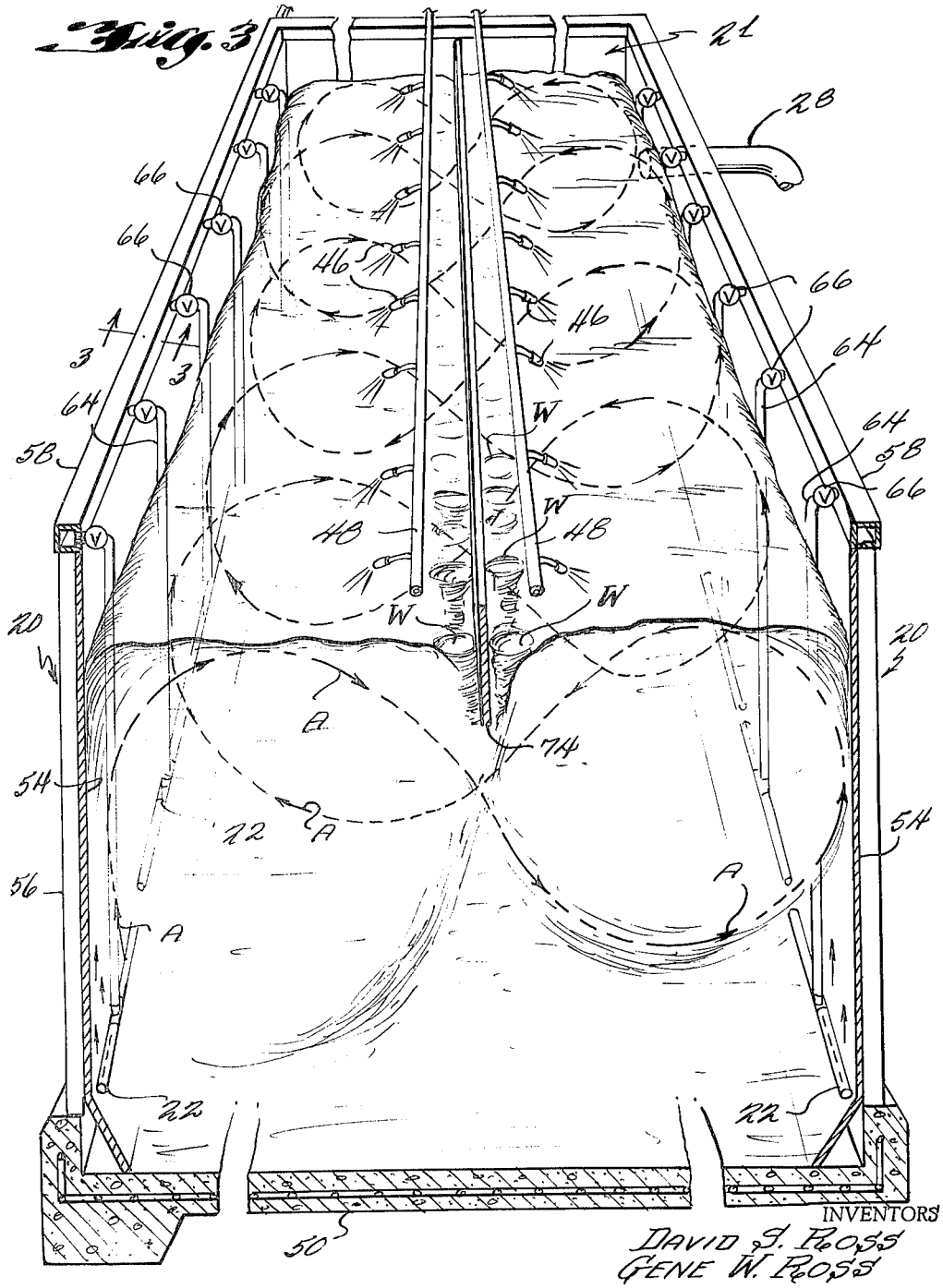

3,236,767
WASTE TREATMENT PROCESS
David S. Ross and Gene W. Ross, Lorain, Ohio, assignors, by mesne assignments, to Amcodyne & Co., Lorain, Ohio, a limited partnership of Ohio
Filed May 16, 1963, Ser. No. 280,946
8 Claims. (Cl. 210—7)

The present invention relates to a waste treatment process and to apparatus for accomplishing such process. More specifically, the present invention relates to an improved method of aerating waste containing liquor and providing a balanced aerobic bacterial activity in the aeration tank and to an improved tank construction suitable for use in aeration tanks as well as other tank uses.

In the treatment of waste, such as sewage, industrial wastes, and chemical wastes or the like, wherein the waste containing liquor contains organic solids with or without inorganic solids, it has been found feasible to treat such wastes by an aerobic digestion process which is based on the premise that essentially all of the stabilization of waste organic material is accomplished by a biochemical action of micro-organisms. When waste containing liquor, such as sewage and the like, is fresh it may contain some oxygen, but this oxygen is quickly exhausted and decomposition of the sewage will begin to be carried on under anaerobic conditions. Decomposition of waste under anaerobic conditions is accompanied by creation of foul odors of compounds containing sulphur, particularly hydrogen sulphide; by odorless gases, such as carbon dioxide and methane; and by other complicated organic compounds. Therefore, it has been found in the treatment of waste that it is desirable to provide sufficient air or free oxygen in the waste to create favorable conditions for aerobic bacterial activity so that all of the anaerobic bacteria which lives only in the absences of air or oxygen will become dormant. As the aerobic life processes are stimulated, they produce enzymes which will metabolize the biologically unstable organic material in waste such as sewage, the enzymes produced by the bacteria causing the colloidal and sustained particles to become absorbed to form a floc.

Heretofore, it has been recognized that the biochemical oxygen demand (B.O.D.) for the incoming waste requires the supply of air or oxygen to the waste liquor, but the quantity of air or oxygen supplied to the waste containing liquor to satisfy its B.O.D. must also be great enough to maintain aerobic bacterial activity in the system. In other words, the aerobic digestion which occurs in the aeration tank is produced by the micro-organisms feeding on the organic solids but the life processes of these aerobic bacteria must be stimulated in the activated sludge admixed with the waste liquor for proper bacterial growth and propagation.

In prior waste treatment processes the raw waste or sewage was usually fed into a preliminary settling tank wherein sludge was settled therefrom and then the sewage was transferred to an aeration tank and mixed with highly activated sludge to accomplish aerobic digestion. The aerated mixture of waste liquor and activated sludge was flowed from the aeration tank to a final settling tank wherein the settled sludge was pumped back into the aeration tank and the clear effluent was discharged over an overflow weir. More recent developments utilize what is known as "an extended waste treatment process" wherein the preliminary settling tank is eliminated and the raw waste containing liquor is flowed directly into an aeration tank while activated sludge from the final settling tank is continuously recirculated to the aeration tank. In the "extended" process, the retention time in the aeration tank is longer, but the necessary equipment for treatment of waste is reduced by elimination of an initial settling tank and its associated equipment. However, in the extended process, the requirement for air to treat a certain volume of waste containing liquor passing therethrough is increased as the liquor must be retained in the aeration tank for longer periods of time.

The regulations of the different States with regard to aerobic digestion processes and systems vary according to the Health Department of the particular State. The detention period in the aeration tanks and the final settling or sediment tanks will vary from State to State depending on the design criteria of the particular State. In some instances the States have imposed regulations regarding air requirements which are based on a function of the width and depth of the tanks. For example, in a State requiring a twenty-four hour detention period, and an aeration requirement of 3 cubic feet per minute per foot of length of the aeration tank or 2100 cubic feet of air per pound of B.O.D. entering the tank daily, such State might have a design criteria which requires that the width of the tank be no greater than 1.75 times the depth of the tank. Consequently, when it is desired to enlarge the system for treating an increased volume of waste containing liquor per day, the increasing of the width of the tank necessitated a corresponding increase of the depth of the tank according to the design criteria, the air requirement for such an enlarged tank being the same for each pound of B.O.D. entering the tank daily. When the depth of the tank is increased, it requires an increase in horsepower for the motors to drive the blowers or compressors which force the air out of the diffuser heads as there is an increased head of the liquor above the diffuser heads.

In prior processes, the aeration for obtaining the desired aerobic digestion was thought best to be accomplished by creating a violent agitation of the liquor in the aeration tank. However, in systems in which the air is diffused into the body of the liquor rather than those where agitation is accomplished by mechanical means, it has been found that the oxygen absorption into the body of liquor can be obtained by controlling the flow path of the waste containing liquor and the activated sludge as the admixture moves from the inlet end of the tank to the outlet end of the tank. The spiral flow type aeration tanks which are elongated tanks having air diffusers running longitudinally along one side of the tank in the bottom portion thereof so as to produce a spiral path of flow of the mixed liquor through the tank from one end to the other have been quite successfully used on tanks having widths and depths falling within the requirements of the width to depth ratio mentioned above. Such types of aeration tanks provide a general roll to the liquor therein in one direction. When it is necessary to enlarge such tanks, the cost of operation is materially increased in horsepower necessary to inject air at greater depths.

The present invention has a primary object to provide an improved process which increases the efficiency of aeration tanks by controlling the flow pattern of the mixed liquors so that flow from one end of the tank toward the other end is in a path wherein the mixed liquors follow a generally figure eight pattern in a widthwise direction of the tank as air is diffused into the tank.

Ancillary to the immediately preceding object, it is a further object of the present invention to provide a process for aeration of liquors in an aeration tank wherein the flow patterns of the mixed liquors through the tanks is such as to create surface originating whirlpools or eddies which draw into the liquors additional air from above the liquors.

Still ancillary to the immediately preceding objects it is a further object of the present invention to provide a process for aerating liquors in a tank, the process involving the injection of air along both sides of the tank near the bottom thereof for creating the generally figure eight flow pattern of the liquors widthwise of the tank as the liquors move lengthwise of the tank.

An important object of the present invention is to provide an improved method of aerating waste containing liquor and activated sludge in an aeration tank wherein the cost of the operation is materially reduced.

Another object of the present invention is to provide a waste treatment process wherein a balanced aerobic bacterial activity is maintained in an aeration tank with activated sludge being continuously supplied to the tank and with waste containing liquor such as sewage being supplied intermittently and variably to the aeration tank.

Another object of the present invention is to provide a waste treatment process wherein an improved method of aerating a mixture of waste containing liquor and activated sludge and absorbing oxygen therein results in an optimum design criteria for tank construction whereby the tanks can be made wider than heretofore possible without materially increasing the depth and yet the process still provides an economical supply of air injected into the tank.

Ancillary to the immediately preceding object of the present invention, it is a further object to provide an improved process for aerating liquors in a tank wherein the tank widths may be enlarged without increasing the depth and the amount of air injected into the tank per foot of length of tank is decreased over previous standards thereby resulting in a substantial savings in the cost of operation. For example, a tank having a depth of 8 feet and a width of 14 feet and requiring 3 cubic feet of air per minute per foot of length can be doubled in width without increasing the depth and require far less air per linear foot of the tank than two conventional tanks of the smaller size.

A further object of the present invention relates to an improved tank construction for use as aeration tanks, swimming pools or the like, the tank construction being such that a conduit for the supply of the fluid to the tank is also used as a structural member to strengthen the tank.

Ancillary to the preceding object, it is a further object of the present invention to provide a pre-fabricated tank structure having metallic panels, such as steel or the like, for walls, the panels having stiffening members to assist in the erection of the same, at least one of the stiffening members being utilized as a conduit for the insertion of fluid into the assembled tank from a suitable source of supply.

These and other objects and advantages of the present invention will appear more fully in the following specification, claims and drawings, in which:

FIGURE 1 is a perspective view of the waste treatment system arranged according to the present invention;

FIGURE 2 is a top plan view of the aeration tank of the present invention as well as showing its relationship to the final settling or sedimentation tank and the blowers or compressors for supplying air to the aeration tank;

FIGURE 3 is an enlarged fragmentary perspective view of the aeration tank and illustrates the novel flow pattern of the waste containing liquor and activated sludge through the length of the tank as it is being treated; and FIGURE 4 is a fragmentary sectional view taken substantially on the line 3—3 of FIGURES 2 or 3 and illustrating the novel wall construction of the pre-fabricated wall assembly for the tank structure.

Referring now to the drawings wherein like characters or reference numerals represent like or similar parts, and in particular to FIGURES 1 and 2 of the drawings, a complete system for treating of wastes such as sewage, industrial waste, chemical waste, or the like is disclosed. In more detail, the raw waste influent, which for the purposes of description will be referred to as sewage, flows from its source, not shown, through a conduit 10 to a sewage lift station or pumping station schematically shown in broken lines at 12. The sewage lift station or pumping station 12 is provided with a comminutor through which the raw sewage passes and any solids therein are ground up, and from the comminutor through a pump into a wet well. From the wet well of the lift station 12, the raw sewage is pumped by a conduit 14 into one end of an aeration tank generally designated at 16. The aeration tank 16 is generally rectangular in shape and is provided with an inlet 18 for activated returned settled sludge at the same end as the inlet 15 for the raw sewage conduit 14. The inlet 15 for raw sewage and inlet 18 for activated sludge are separate and spaced from each other. Arranged along each of the side walls 20 of tank 16 and positioned adjacent the bottom thereof are diffuser heads 22 for injecting finely divided air bubbles into the waste containing liquor and activated sludge within the tank. The positioning of the diffuser heads 22 in the tank 16 for causing the novel flow pattern of the admixture of waste containing liquors and activated sludge will be explained in more detail later in the specification.

Air for the diffuser heads 22 is supplied from blowers 24 suitably housed in a building 26 located at a remote point from the tank. While blowers 24 have been disclosed, it will be appreciated that air compressors may be used if desired.

At the discharge end 21 of the tank 16 there is provided a pipe 28 for receiving the treated admixture of waste containing liquor and activated sludge, the pipe 28 transferring the admixture to a final settling or sedimentation tank 30. The settling tank 30 is provided at its end remote from the inlet 31 of the transfer pipe 28 with a discharge pipe 32 for discharging the clear effluent received from an overflow weir (not shown) after it passes through a quiescent zone. Pipe 32 discharges the clear effluent into any available body of water such as a stream or creek 33. The final settling tank 30 has a quiescent atmosphere in order that the organic solids, i.e., activated sludge, may be separated from the liquid portion of the treated admixture. Gravity causes the particles to settle in the water and as these particles settle in the water they are scraped by a scraper 34 to a hopper end 36 of settling tank 30 and from there returned to the aeration tank 16 as activated sludge. In more detail, air lift pump 38 may be provided for withdrawing the activated sludge from the bottom of the sludge hopper 36 for transferring it through the two pipes 40 to the discharge ends thereof, indicated at 18. A froth control pump 42 is provided at the end of the final settling or sedimentation tank 30 opposite its inlet end 31, the froth control pump 42 being operable to supply substantially clear effluent through the pipe 44 to spray nozzles 46 (FIG. 3) carried on each of the conduits 48. The spray nozzles may be of the type disclosed in United States Patent 3,066,870, issued December 4, 1962, to E. E. Hanson, the spray from the nozzles 46 being utilized to control or beat down the froth which may appear on the surface of the admixture in the aeration tank.

The aeration tank 16 is an improved tank construction over that disclosed in our United States Patent 3,059,243, issued October 23, 1962. In more detail, the tank includes a reinforced concrete bottom 50 in which is mounted the side wall assemblies 20 and the end wall assemblies 21. The side wall assemblies 20 and 21 may be erected at the site in a manner similar to that disclosed in our aforementioned United States patent and joined together to form the liquid-tight enclosed walls of the tanks prior to the pouring of the concrete bottom 50. However, the side wall assemblies 20 are of improved construction over that disclosed in our aforementioned United States patent in that the wall assemblies 20 include a metal panel 54 having vertical stiffening ribs 56 on and outside horizontally spaced along their length. Along each of the top panels 54 there is provided a horizontally extending stiffening member 58 which is tubular in cross section. The stiffening member 58 is welded to the top edge of the panel 54 as well as to the upper end of each of the vertical stiffening ribs 56 so that the entire wall assembly 20 is sufficiently rigid to enable it to be handled in transportation from the factory and during erection. The tubular stiffening members 58 also serve the additional function of providing a conduit for the supply of a fluid to the tank, and, in this particular instance, air to the diffuser heads 22.

In more detail, the tubular stiffening members 58 are connected at one end to a manifold pipe 60 leading from the blowers 24 of the house 26. The opposite end of each of the tubular stiffening members 58 is closed and a series of outlets 62 are provided for receiving the diffuser pipes 64. The diffuser pipes 64 may each be provided with valves 66 so that any of the diffuser heads 22 at the lower end of the pipe 64 may be selectively turned off and on as desired. By providing the tubular stiffening member 58 as an integral part of the wall assembly 20, the panel 54 is stiffened and added fluid supply pipes for the diffuser pipe are eliminated.

As shown in FIGURE 2, a pipe 68 may be tapped into the manifold pipe 60 for supplying the air to the air lifts 38 in the final sedimentation tank 30.

A plurality of transverse members 70 may be provided across the top of the tank 16 for supporting a longitudinally extending catwalk 72 as well as a longitudinally and vertically extending baffle plate 74. The baffle plate 74 only extends beneath the level of the mixture in the tank a short distance. It will be noted that the catwalk 72 is immediately above the spray nozzles 46 and thus an operator may quickly inspect and service the nozzles to make sure they are free from dirt or clogging.

As mentioned at the outset of this specification, the aeration tank 16 provides in an improved process for aerating a mixture of waste containing liquor and activated sludge so as to provide a balanced aerobic bacterial activity. It will be noted from FIGURES 2 and 3 that the diffuser heads 22 which may be of the type disclosed in our copending application, Serial No. 256,735, filed February 6, 1963, are arranged longitudinally of the tank 16 adjacent the junction of the side walls 20 and the bottom 50. Thus, there is provided two rows of diffuser heads 22, the heads being positioned slightly above the bottom 50 of the tank. The diffuser heads 22 of one row are oppositely disposed from the diffuser heads 22 of the other row and when air is supplied to them, they discharge finely divided air bubbles which have an initial movement upwardly along the respective side walls 20 of the tank. In this respect, the diffuser heads 22 must be close enough to the walls 20 so that there can be no return flow down the walls. It is well known, the smaller the bubble size the greater the oxygen absorption into the body of the liquid. However, the important feature of the present invention is the unusual flow pattern of the mixture of waste containing liquor and activated sludge caused by the injection of the air by the two rows of diffuser heads 22, such pattern resulting in an even greater absorption of oxygen than heretofore realized.

As shown in FIGURE 3, the unusual pattern of flow of the present invention is illustrated by the arrows A which rise toward the surface of the tank adjacent one of the side walls 20 and then flows toward the middle of the tank and then downwardly before reaching the middle of the tank, and across the middle of the tank toward the opposite side wall 20. The circuitous flow path then continues upwardly along this side wall 20 toward the surface and then toward the middle of the tank and downwardly across the middle of the tank back toward the first side wall 20 and then back upwardly and so forth throughout the length of the tank. The circuitous flow path through the length of the tank is in effect a flow in a generally figure eight path transverse of the tank with the flow path advancing along the length of the tank for each figure eight of travel through the tank. The alternating rolling action produced by this figure eight during the circuitous flow path from one end of the tank toward the other causes whirlpools W to originate at the surface, the whirlpools carrying air from the surface down into the body of liquor. The whirlpools W occur along the longitudinal length of the tank adjacent the longitudinal axis. The whirlpools W draw in air from the surface of the mixture and air is absorbed into the mixture and assists the diffuser heads in providing the proper amount of oxygen for proper aerobic bacterial activity. By providing the baffle member 74 along the center line of the tank and extending slightly down into the mixture in the tank, the whirlpools are maintained on opposite sides of a vertical plane through the longitudinal axis of the tank. However, it has been found that the unusual circuitous flow path can be obtained even without the baffle member 74 and whirlpools will still be produced and supply sufficient additional oxygen for absorption into the mixture. The baffle member 74 assists in keeping the foam on the surface of the tank from one side segregated from the foam on the other side and thus the spray nozzles can easily control the froth without the froth building up in a peak between oppositely disposed nozzles.

It would be reasonable to expect that by arranging the diffuser heads 22 as shown along each side wall there would be set up two separate rolls producing two separate spiral flows along the length of the tank. However, experiments have been conducted with air being supplied to the diffuser heads in the order of 3 cubic feet per minute per foot of length of tank and with colored Ping-pong balls inserted into the tank and it has been found that the flow pattern of the Ping-pong balls has generally assumed the circuitous path described above. Also, it is noted that the finely divided air bubbles from the diffuser heads are substantially all entrapped in the mixture of waste containing liquor and activated sludge with only a relatively few being released to the surface. Tests have also been conducted supplying air through the diffuser heads 22 at rate in the order of 2 cubic feet per minute per foot of length of tank with the same resulting in the circuitous flow path of the present invention. By the arrangement just described, the widths of the aeration tanks may be increased to double that which is required under most State laws without increasing the depth of the tank and the effluent from the system tested has no more impurities as measured in parts per million than those tanks which require more air and greater depths.

The process of the present invention requires approximately one-third less air per gallon of influent than previous systems and this results in considerable savings in operating costs over a period of time as less horsepower is needed for injecting the air into the shallow tanks.

The method and tank structure described have been merely for the purposes of illustrating the principles of the invention and as disclosed such method and tank structure fully and efficiently accomplishes the objects and advantages of the invention. Therefore, the terminology used in the specification is for the purposes of description and not limitation, the scope of the invention being defined in the claims.

What is claimed is:

1. In a waste treatment process, the improved method of aerating waste containing liquor in an elongated generally rectangular aeration tank having a bottom and opposed vertical side walls without the settling of waste particles from the waste containing liquor within the tank, comprising the steps of: introducing waste containing liquor adjacent to one end of the tank; introducing activated sludge into the tank at said one end of the tank to provide an admixture of waste containing liquor and activated sludge; creating a continuous circuitous flow path for the waste particles of the admixture from said one end of the tank to the opposite end of the tank which is unobstructed in any longitudinal vertical plane through the tank and which is generally a figure eight pattern transversely of the tank through any transverse plane of the tank by injecting and entraining finely divided bubbles of oxygen containing gas into the admixture continuously along the entire length of the tank at each junction of the bottom and the opposed vertical side walls of the tank, the contiguous portions of the circuitous path for any figure eight pattern in the area where the contiguous portions cross a vertical plane through the longitudinal axis of the tank being in generally downward directions toward the opposite side walls of the tank resulting in an infinite number of shearing surfaces to increase physical contact between waste particles, activated sludge and entrained bubbles; and removing the treated admixture at the opposite end of the tank.

2. The waste treatment process as claimed in claim 1 in which the circuitous flow of the admixture creates a series of whirlpools lengthwise of the tank, the whirlpools originating at the surface of the admixture and drawing air into the admixture for additional aeration of the same.

3. In a waste treatment process as claimed in claim 1, in which the activated sludge is continuously introduced into the tank and in which waste containing liquor is intermittently and variably introduced into the tank.

4. In a waste treatment process as claimed in claim 1, in which activated sludge is continuously introduced into the tank and in which waste containing liquor is intermittently and variably introduced into the tank at the same end thereof but spaced from a point of introduction of the activated sludge.

5. In a sewage treatment process wherein aerobic digestion is accomplished by aeration of sewage containing liquor and recirculation of activated sludge without settling of waste particles of the sewage containing liquor, the improved method of aerating and providing a balanced aerobic bacterial activity in an elongated generally rectangular tank having a bottom and opposed vertical side walls comprising the steps of: introducing raw sewage liquor into one end of the tank; continuously introducing activated sludge into the tank at the same end which the raw sewage liquor is introduced to provide an admixture of raw sewage liquor to be treated and activated sludge; injecting finely divided bubbles of oxygen containing gas into the admixture in the tank continuously along the entire length of the tank at each junction of the bottom and opposed vertical side walls of the tank for aerating and setting up a flow of the admixture from the entry end of the tank toward the opposite end of the tank in a circuitous flow path, the circuitous flow path being unobstructed in any longitudinal plane of the tank and being in a continuous rolling motion generally upwardly along one vertical side wall and then toward a vertical plane through the longitudinal axis of the tank downwardly across the same toward the other vertical side wall of the tank and then upwardly along the other vertical side wall of the tank and backwardly across the top of the tank and then downwardly and back across the vertical plane through the longitudinal axis of the tank toward the first vertical side wall and generally upwardly therealong and continuously so on throughout the entire length of the tank whereby an infinite number of transverse shearing surfaces results between an infinite number of transverse planes of the tank thereby increasing physical contact between waste particles, activated sludge, and entrained bubbles; and removing the treated admixture at the opposite end of the tank.

6. In an extended sewage treatment process as claimed in claim 5, wherein the raw sewage liquor is intermittently and variably introduced to the tank.

7. In a waste treatment process as claimed in claim 5, including the step of flowing the admixture in the circuitous flowpath in a rolling motion at a velocity of flow sufficient to cause whirlpools on the surface of the mixture along the length of the tank, the whirlpools drawing air into the admixture for additional aeration of the same.

8. In a waste treatment process as claimed in claim 7 in which the flow of the admixture adjacent the surface toward the middle of the tank is baffled downwardly a short distance beneath the surface so that the whirlpools originating at the surface are on either side of a median throughout the length of the tank.

References Cited by the Examiner

UNITED STATES PATENTS

| | | | |
|---|---|---|---|
| 1,343,797 | 6/1920 | Stott et al. | 210—14 |
| 2,071,591 | 2/1937 | Tholin | 210—17 |
| 2,100,521 | 11/1937 | Robinson | 261—121 |
| 2,126,228 | 8/1938 | Streander | 210—220 |
| 2,479,403 | 8/1949 | Powers | 210—7 |
| 2,650,810 | 9/1953 | Nordell | 261—121 |

OTHER REFERENCES

Metcalf et al.: American Sewerage Practice, vol. III, Disposal of Sewage, Third edition, 1935, McGraw-Hill, pp. 635–647 relied on.

MORRIS O. WOLK, *Primary Examiner.*